(No Model.)
J. B. CURTIS.
PROCESS OF MAKING HOLLOW GLASSWARE.
No. 414,144. Patented Oct. 29, 1889.
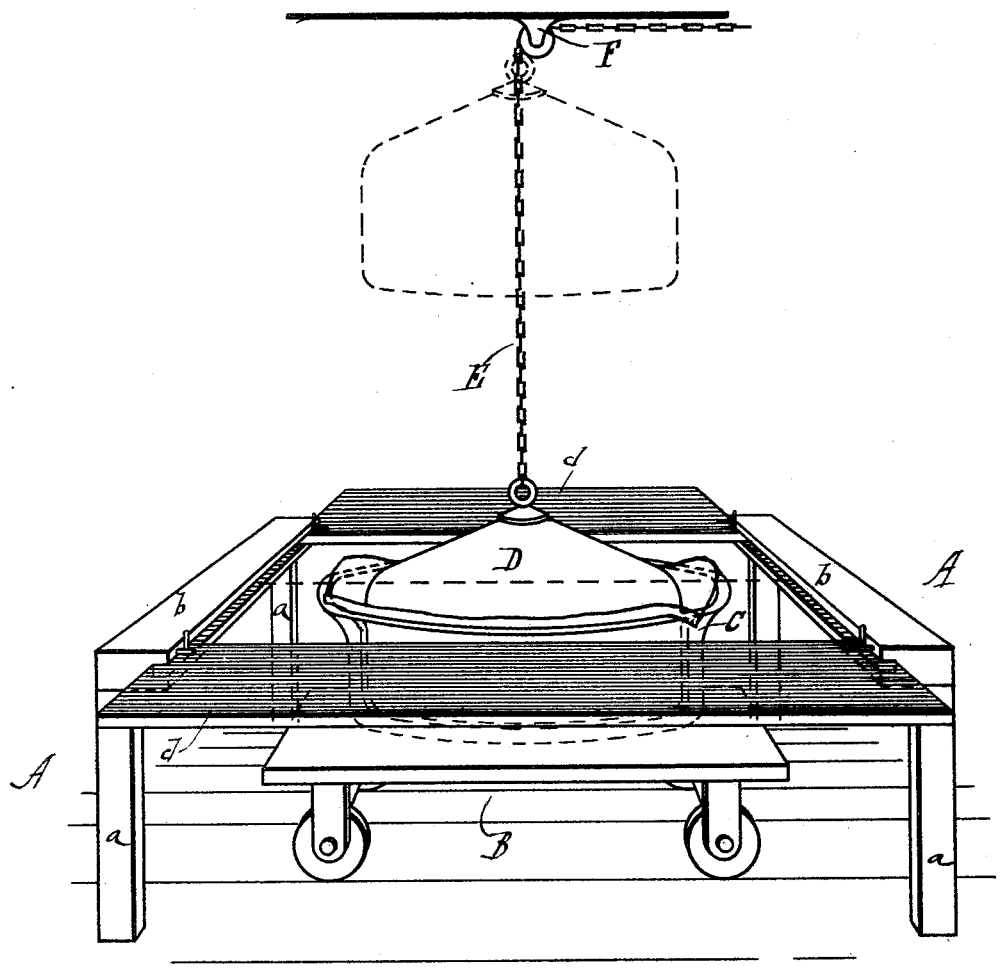

UNITED STATES PATENT OFFICE.

JOHN B. CURTIS, OF CAMBRIDGE, ASSIGNOR OF ONE-HALF TO CHARLES F. MARTINE, OF BOSTON, MASSACHUSETTS.

PROCESS OF MAKING HOLLOW GLASSWARE.

SPECIFICATION forming part of Letters Patent No. 414,144, dated October 29, 1889.

Application filed June 11, 1888. Serial No. 276,715. (No specimens.)

*To all whom it may concern:*

Be it known that I, JOHN B. CURTIS, of Cambridge, in the county of Middlesex, State of Massachusetts, have invented a certain new and useful Improvement in the Process of Making Hollow Glassware, of which the following is a description sufficiently full, clear, and exact to enable any person skilled in the art or science to which said invention appertains to make and use the same.

My invention relates especially to means for forming or molding hollow glassware, or articles composed of glass and similar vitreous materials—such, for instance, as bath-tubs, caskets, battery-jars, &c.; and it consists in the novel features hereinafter set forth and claimed, whereby articles of this character may be readily produced which are less frangible than when formed in the ordinary manner.

The nature and operation of the improvement will be readily understood by all conversant with such matters from the following explanation.

In carrying out my process I take the required quantity of ordinary glass in a molten state and transfer it to a flat iron table, where it is rolled into a blank of uniform thickness throughout in substantially the same manner as employed in the manufacture of plate-glass, the blank being of suitable size to form the article desired. The blank, while in a plastic condition, is then laid onto an iron former or mold constructed in the shape of the article to be made and allowed to contract and cool, thereby shaping itself to the mold. The glass is then removed from the former and annealed in the usual manner.

The uniformity in the thickness of the glass equalizes the contraction as it cools, thereby enabling the article to be annealed more perfectly and rendering it much tougher and less liable to be accidentally chipped or broken than when formed in the ordinary manner.

When it is necessary to produce particularly-nice work, I employ a hollow core adapted to receive the former and glass blank, which are inserted therein, thus causing the blank to shape itself to the former more quickly and perfectly than when contraction alone is relied upon.

It is my intention in practice to construct the table upon which the blank is made in such a manner that the mold or former may be forced upward through the middle thereof and under said blank, so that, particularly in constructing flat forms, the work may be greatly facilitated.

The accompanying drawing is a perspective view of an apparatus for carrying out my process in the making of bath-tubs.

The glass-rolling table A comprises supporting-legs *a*, grooved rails *b*, and the sliding leaves *d*, which are adapted to slide in said grooved rails, said leaves constituting the rolling table or board. A truck B, adapted to travel under said table, carries a hollow mold C in the shape of a bath-tub. The hollow plunger D is suspended by a chain E from an overhead pulley F. This plunger is of a shape corresponding with the shape of the mold C, but of smaller size adapted to fit into said mold.

The molten glass is taken from the glass-furnace and placed on the leaves of the table, which are closed together, and rolled thereon. When sufficiently rolled, the leaves are drawn apart, and the sheet of pliable glass is dropped into the mold. The plunger is then lowered into the mold and serves to support the sheet-glass on the sides of the mold until it is sufficiently hardened. The plunger is then withdrawn and the glass article removed and annealed.

Having thus explained my invention, what I claim is—

The process of making hollow glassware direct from the molten-glass composition, which consists in rolling the molten-glass metal material into a flat blank of uniform thickness, and then placing said blank, before cooling and while in a plastic condition, onto a former or mold and permitting it to cool and contract on said former, whereby it assumes the shape of the former, and finally removing the so-shaped blank from the former and annealing it, substantially as described.

JOHN B. CURTIS.

Witnesses:
O. M. SHAW,
E. M. SPINNEY.